United States Patent
Hu

(10) Patent No.: US 7,373,334 B2
(45) Date of Patent: May 13, 2008

(54) MOST PROBABLE EXPLANATION GENERATION FOR A BAYESIAN NETWORK

(75) Inventor: Wei Hu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 11/354,673

(22) Filed: Feb. 15, 2006

(65) Prior Publication Data

US 2006/0184487 A1    Aug. 17, 2006

Related U.S. Application Data

(63) Continuation of application No. PCT/CN03/00841, filed on Sep. 30, 2003.

(51) Int. Cl.
*G06F 17/00* (2006.01)
*G06N 5/02* (2006.01)

(52) U.S. Cl. .............................. 706/46; 706/45; 706/14

(58) Field of Classification Search .................. 706/46, 706/45, 14; 707/1
See application file for complete search history.

(56) References Cited

U.S. PATENT DOCUMENTS

| | | | |
|---|---|---|---|
| 6,456,622 | B1 | 9/2002 | Skaanning et al. |
| 2003/0163437 | A1* | 8/2003 | Lee .............................. 706/47 |
| 2003/0225718 | A1* | 12/2003 | Shmulevich et al. .......... 706/46 |
| 2004/0215591 | A1* | 10/2004 | Eruhimov ........................ 707/1 |
| 2004/0254903 | A1* | 12/2004 | Heckerman et al. .......... 706/46 |
| 2005/0027665 | A1* | 2/2005 | Thiesson et al. .............. 706/25 |
| 2005/0027710 | A1* | 2/2005 | Ma et al. ..................... 707/100 |
| 2005/0102251 | A1* | 5/2005 | Gillespie ........................ 707/1 |
| 2007/0042362 | A1* | 2/2007 | Frudakis ......................... 435/6 |

FOREIGN PATENT DOCUMENTS

| | | |
|---|---|---|
| CN | 1349636 | 5/2002 |
| DE | 10132014 | 1/2003 |

OTHER PUBLICATIONS

Dsvid Heckerman et al., Decision-Theoretic Troubleshooting, 1995, ACM, vol. 38, No. 3, 49-57.*

* cited by examiner

*Primary Examiner*—Joseph P Hirl
(74) *Attorney, Agent, or Firm*—Schwegman, Lundberg & Woessner, P.A.

(57) ABSTRACT

Methods, systems, and apparatus are provided to generate a most probable explanation (MPE) for a Bayesian Network (BN). A first data structure is populated by iterating from the leaves of a junction tree (derived from the BN) to the root and retaining maximum potentials along the way. A second data structure records selective index locations that map into the first data structure. These selective locations correspond to selective maximum potentials housed within the first data structure. All the selective maximum potentials are resolved once a root maximum potential is known for a given problem. The selective maximum potentials form a MPE through the junction tree to reach the result.

19 Claims, 5 Drawing Sheets

MOST PROBABLE EXPLANATION GENERATION FOR A BAYESIAN NETWORK

This application is a continuation under 35 U.S.C. 111(a) of International Application Ser. No. PCT/CN2003/000841, filed 30 Sep. 2003, and published in English as International Publication No. WO 2005/031591 A1 on 7 Apr. 2005, which is incorporated herein by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2003, Intel, Corporation, All Rights Reserved.

TECHNICAL FIELD

Embodiments of the present invention relate generally to decision networks and graphical models, and more particularly to most probable explanation (MPE) generation for a Bayesian Network (BN).

BACKGROUND INFORMATION

Bayesian Networks (BNs) have been widely used in software applications for purposes of making decisions by electronically modeling decision processes. Some example applications that are particularly well suited for BNs include artificial intelligence applications, speech recognition, visual tracking, pattern recognition, and the like. BN is often viewed as a foundation for probabilistic computing.

A BN is based on Bayesian logic, which is generally applied to automated decision making and inferential statistics that deals with probability inference. A static BN differs from a Dynamic BN (DBN) in that the DBN can adjust itself over time for stochastic (probabilistic) variables. However, some decision processes that are not likely to evolve over time are better suited to a BN implementation. Moreover, a DBN includes additional data structures and processing that may make some decision processes incapable of being efficiently modeled within a DBN. Correspondingly, based on the decision process being modeled a BN may be more favorably used over a DBN. Both BN and DBN applications model a decision-making process as a decision tree where each node of that tree identifies a particular decision state, and each decision state (node) can itself be a tree data structure.

A Most Probable Explanation (MPE) is a decision state sequence (path) through a BN for a given problem having observed outputs (evidences). In other words, if a result is known, the MPE is the states of all hidden nodes in the BN that most likely explain the observed evidence. Once a BN has been trained or used for a few different decisions, the BN can be used to produce its own decision based on observable evidence for a given problem or used to evaluate different observations.

Conventional MPE generating algorithms are produced by a technique that requires two complete passes on the BN. In the first pass all cliques' potentials are assigned and evidences are collected from the leaves of the junction tree, which is derived from the BN, to the root of the junction tree. Then the maximum element of the root clique is selected and stored and all other elements in the root clique are set to zero. During the second pass (referred to as the distribute evidence processing step), the junction tree is iterated from its root potential back to all the leaf cliques. During this second pass, evidence is redistributed based on each state (clique) of the junction tree being evaluated, and selective maximum potentials for each state are retained, such that when the second pass is completed, and MPE is produced. As is apparent, conventional techniques for generating a MPE are processor and memory intensive.

Therefore, there is a need for improved MPE generation.

DESCRIPTION OF THE EMBODIMENTS

Novel methods, systems, and apparatus for generating MPEs for BNs are described. In the following detailed description of the embodiments, reference is made to the accompanying drawings, which form a part hereof, and in which are shown by way of illustration, but not limitation, specific embodiments of the invention. These embodiments are described in sufficient detail to enable one of ordinary skill in the art to understand and implement them. Other embodiments may be utilized; and structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

Figure 1:
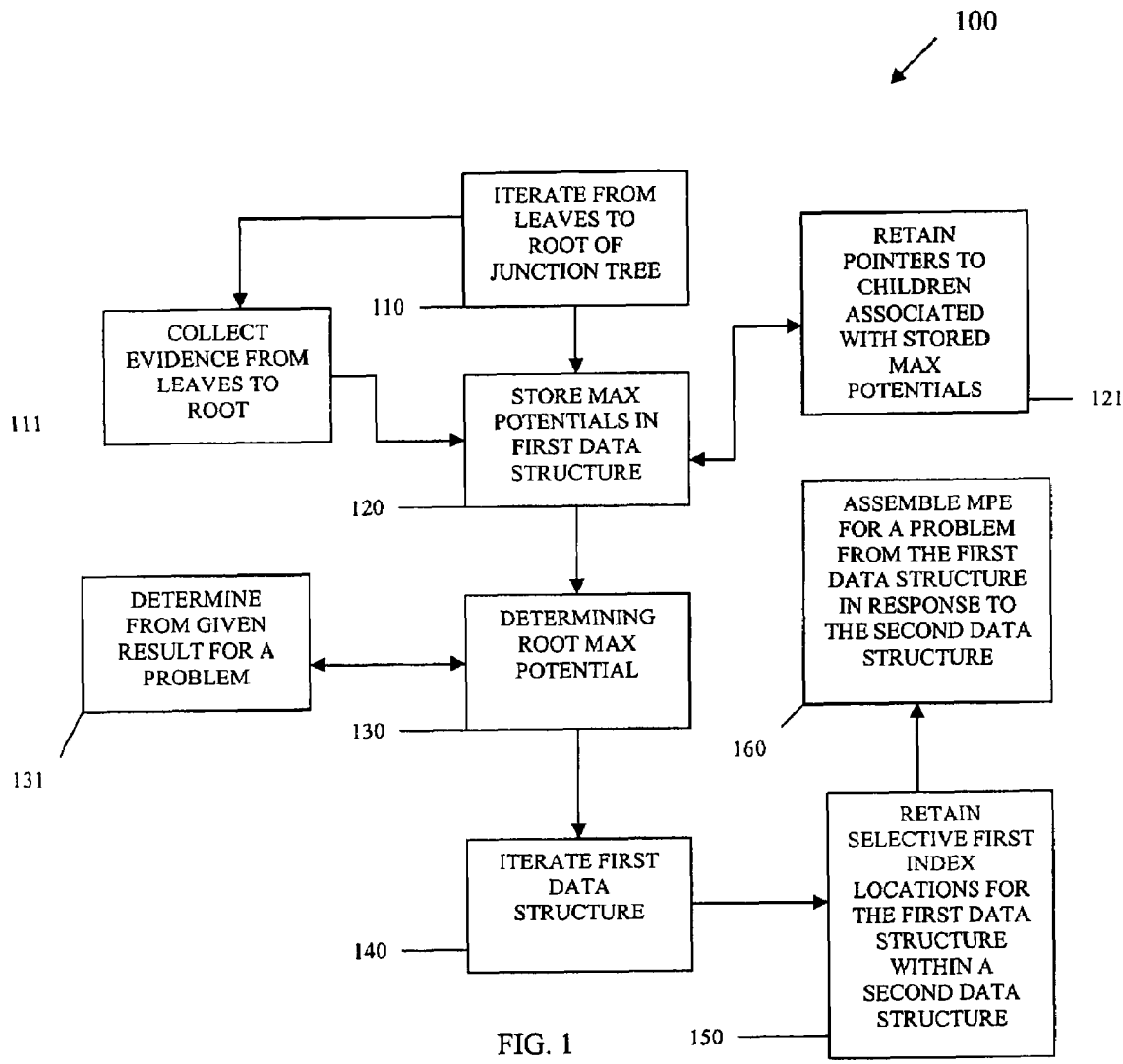
FIG. 1 is a flow diagram of a method to generate a MPE for a BN in accordance with one embodiment of the invention.

FIG. 1 is a flow chart of a method 100 to generate a most probable explanation (MPE) for a BN. The method 100 is implemented in a computer-accessible medium as one or more software applications. The method 100 need not be executing in a computer-accessible medium; however, when the method 100 is executed a MPE for a given problem of a BN is produced, according to the processing described below and in other embodiments of the invention.

Initially, a junction tree is derived from a BN, using any well-known and conventionally available techniques or utilities.

Before the BN is used, the potentials of the junction tree is initialized. The potentials are the probabilities assigned to decision states and are used during operation for determining the transitions from one decision state to another decision state. Moreover, the potentials are dependent upon a set of random variables. The evidence collected during the first pass results in the value assignments for the random variables at each decision state (leaf) of the BN and may also alter the initially set potentials for each clique.

With this initial context presented, at 110, the BN is iterated from its leaves to its root. During this iteration, at 111, observable evidence is collected so as to set the values for random variables and adjust potentials for each evaluated clique of the junction tree. Furthermore, during the first pass maximum potentials for each of the child cliques are stored or retained in memory, storage, or both memory and storage at 120.

In one embodiment, the retention of maximum potentials for each clique of the junction tree is stored in a first data structure. The first data structure is a multidimensional (M) integer array, where M is the number of random variables being used in the BN. For example, with three random variables X, Y, and Z associated with a given BN, the first data structure has 3 dimensions (M=3 because there are three random variables) and each dimension has two index locations (M=3−1 because any particular dimension has maximum potentials for each of the remaining 2 dimensions). Thus, the first data structure has a size of M defined as the total number of random variables.

As a further example, consider three random variables: X, Y, and Z. In this example, the first data structure is an integer array having 3 dimensions (M=3, the number of random variables): a dimension for X, a dimension for Y, and a dimension for Z. Moreover, each dimension includes two indexed locations (location 1 and 2, i.e. size=2) for housing maximum potentials for each of the remaining dimensions with respect to a particular dimension. With this example, it is apparent that there are a total of 8 index locations into the first data structure namely: 1) X1, Y1, Z1; 2) X1, Y1, Z2; 3) X1, Y2, Z1; 4) X1, Y2, Z2; 5) X2, Y1, Z1; 6) X2, Y1, Z2; 7) X2, Y2, Z1; and 8) X2, Y2, Z2.

Moreover, each index location for each random variable can be further associated with a pointer to the specific leaf (node) to which that index location corresponds within the BN, as depicted at 121. This pointer permits direct access from the first data structure into a specific location (leaf or node) within the clique. Therefore, each index location can house a maximum joint probability distribution value and a pointer to the specific leaf or decision state within the clique where the distribution value can be found. In other embodiments, the specific location of a specific distribution value within the BN is derived or obtained by the coordinates of the index locations within the first data structure. In other words, a specific index location can be X1, Y1, and Z1 for a three-dimensional first data structure; these coordinates within the first data structure map to a specific location within the clique. Thus, with these embodiments no pointers need to be stored at all within the index locations of the first data structure.

At 130, a root maximum potential is determined. In one embodiment, the root maximum potential and its corresponding root node within the BN is based on a given result or expected result for a given problem at 131. The determination of the root node and its associated root maximum potential permits processing within the junction tree to resolve a MPE for a problem based on the result.

Conventionally, the process of resolving a MPE through the BN occurs by performing a full first iteration on the junction tree that was derived from the BN based on the identified root maximum potential and its associated configurations of nodes in the root. During a conventional second pass, evidence is redistributed going back through the junction tree from the root to the leaves and all potentials are then individually evaluated for purposes of selecting each cliques maximum potential needed to construct the MPE.

With embodiments of the present invention, there is no need to perform a second pass on the junction tree and no need to redistribute evidence in order to select the proper maximum potentials. This is done by building the first data structure as described above during the first pass and then iterating the first data structure from the root maximum potential back to the all the leaves' potentials.

Correspondingly, at 140 the first data structure is iterated from the determined root maximum potential back to all the leaves' maximum potential. During this backtracking iteration of the first data structure, selective first index locations associated with selective maximum potentials of selective leaves are retained in a second data structure at 150. That is, the second data structure during the iteration at 140 of the first data structure retains integer index-location values that map directly into the selective locations of the first data structure. These selective locations of the first data structure represent the maximum potentials that are needed to form the MPE for all variables of the BN.

Continuing with the example presented above, consider a first data structure having 3 dimensions (3 random variables) where each dimension includes 2 index locations, the maximum potential values populated during the first pass result in a first data represented as (4, 3, 5, 2, 1, 6, 8, 7). Moreover, consider further that the root maximum potential is determined to be value 7 from the first data structure based on a determined result. In this example, the iteration of the first data structure beginning at 7 (root maximum potential) and selecting maximum potentials along the way back to an initial leaf potential may produce an MPE having maximum potential values (5, 3, 8, 7).

In the present example, the second data structure is represented as an integer array having values (3, 2, 7, 8). The index locations of the second data structure are locations 1 through 4 having the values of 3, 2, 7, and 8 respectively. Each of these retained values corresponds to an index location within the first data structure. Thus, the $1^{st}$ index location of the second data structure has a value of 3, if that value (3) is used to index into the first data structure at first data structure location 3, a value of 5 is obtained. Moreover, the $4^{th}$ index location of the second data structure includes a value of 8, and in a like manner if 8 is used to obtain the $8^{th}$ index location of the first data structure a maximum potential value of 7 is obtained. Thus, the MPE (5, 3, 8, 7) is entirely derived in response to the second data structure having values (3, 2, 7, 8) from the first data structure. Essentially, the second data structure is a map into the first data structure for obtaining selective maximum potential values associated with a given root maximum potential for the result of a given problem.

The example presently being discussed is presented as a single dimensional array; however, this is done for purposes of illustration only and for purposes of ready comprehension. Each index location within the present example for the first data structure is actually properly referenced by three coordinates (one for each random variable X, Y, and Z). Thus, the index locations included within the second data structure will actually include these integer values for each selective maximum potential. One of ordinary skill in the art readily recognizes and appreciates this distinction and the value of providing the presenting example as single dimensional arrays for purposes of ready understanding.

Therefore, at 160, a MPE is assembled for a given result and problem from the first data structure in response to index-location values retained in the second data structure. The processing used for generating the MPE during the iteration of the first data structure at 140 is done on integer arrays having integer values. Thus, the required memory is decreased and processing throughput is improved over conventional techniques. Often floating-point calculations are necessary during a full second pass on the junction tree that is derived from the BN with conventional techniques, because evidence is redistributed and calculations duplicated when determining maximum potentials back through the junction tree from the root to all its cliques.

An example block of pseudo-code conforming generally to the C programming language for performing the iteration of the first data structure at 140 and generating the second data structure is defined as:

```
/* Begin backtracking processing iterating first data structure defined as
root representing the starting location a root maximum potential
Begin;
MPE = [];
MAX_entry = [];
Max_entry(root) = i;
For P = pre-order of the junction tree do;
    For C = children of P do;
    Begin;
        i = Max_entry(P);
        According to i, find a corresponding entry in separator {P,
C}, say j;
        i = backpointer {P,C}(j);
            Max_entry(C) = i;
        MPE(C) = convert i to configuration;
    End; /* inner for-loop
end; /* outer for-loop
end; /* backtracking or iterating of first data structure
©Intel Corporation, 2003
```

Although the first data structure and second data structure are presented herein as integer arrays, such is not always the case. Any efficient first and second data structure can be used to implement embodiments of the invention. For example, hash tables may be used or other customized data structures. As long as the first data structure maintains maximum potentials for each leaf vis-à-vis its connecting leaves and the second data structure maintains index locations into the first data structure for selective maximum potentials needed for building a MPE, then efficiency is achieved and conforms to the teachings of the embodiments presented with this invention. These techniques provide efficiency, since conventional techniques are forced to re-distribute and re-evaluate the entire junction tree on a second pass in order to produce a MPE, whereas the techniques presented herein only iterate the first data structure to produce a second data structure which can then be used to readily assemble the MPE. The relationship between the first and second data structures and the population of the first and second data structures are unique over conventional techniques and provide efficient improvement over conventional MPE generation algorithms.

Figure 2:
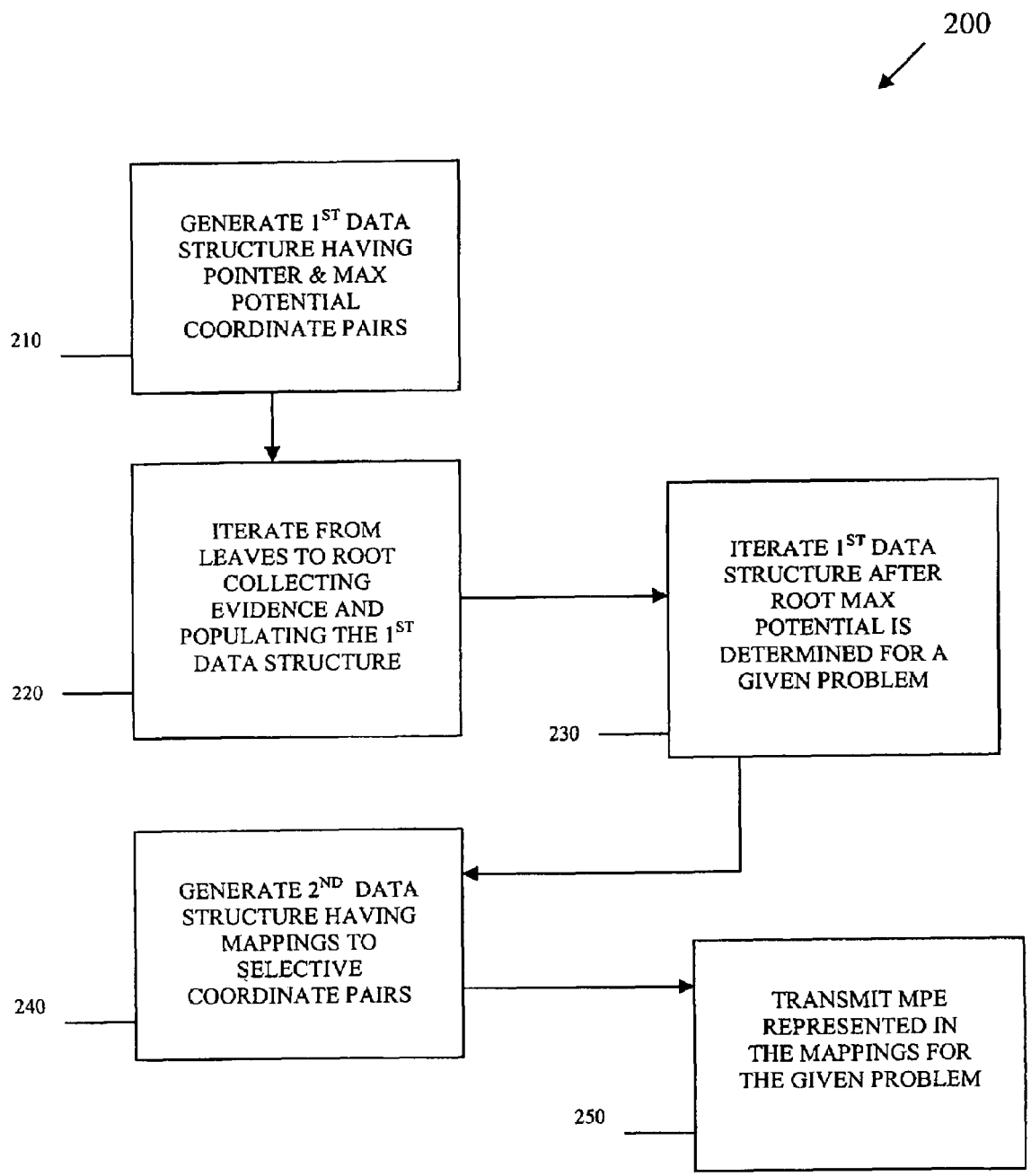
FIG. 2 is a flow diagram of another method to generate a MPE for a BN in accordance with one embodiment of the invention.

FIG. 2 is a flow chart of another method 200 to generate a most probable explanation (MPE) for a BN. The method 200 is implemented in a computer-accessible medium as one or more software applications. The method 200 can be interfaced to a network or one or more processing devices during operation for generating an MPE for a given problem associated with a decision process represented in a BN.

Initially, a BN representation associated with a problem is obtained using one or more conventional software utilities, techniques, or applications. A specific instance of the problem also includes a variety of observable evidence. This observable evidence is values for random variables used with the BN. The BN includes any non-zero integer number M of random variables associated with its decision process.

After the BN is initialized for a specific problem being evaluated and a junction tree derived from the BN along with its potentials; a first data structure associated with the junction tree is generated at 210. The first data structure includes a plurality of dimensions. Each of those dimensions includes index locations for each of the remaining dimensions (i.e. equals the dimensions of the corresponding separator). Each index location is used for housing the joint maximum potential (probability distribution) for a specific remaining dimension with respect to the specific dimension associated with each index location. Moreover, within each index location a pointer value is available that points to a specific child (decision state) within the junction tree that corresponds to the housed maximum potential. Therefore, each index location within the first data structure includes a coordinate pair value, and the coordinate pair is a maximum potential value and a pointer value associated with the location within the BN where the maximum potential value was obtained.

At 220, the first data structure is populated by iterating the junction tree from its initial leaves to its root and collecting evidence (observable random variable values) for the given instance of the problem being evaluated. During this iteration, the collected evidence may alter the initially assigned potentials for the cliques and if such is the case adjustments are made to the potentials associated with the affected cliques as needed. Additionally, during the iteration, each clique's maximum potential vis-à-vis its connecting cliques is retained in a unique index location of the first data structure along with a pointer to the specific element in the corresponding clique associated with the retained potential.

Once the iteration is completed (first pass), a root maximum potential is determined at 230. The root maximum potential is known when a result is provided or an expected result is provided for the problem being evaluated within the BN. When the result is known, the root maximum potential is known, since this is the final decision state of the BN needed to reach the known result.

At this point in processing, the first data structure includes all the needed information for constructing a MPE for the problem and result. Conventionally, this was not the case; in fact, conventionally a full second pass on the entire junction tree was necessary after the first pass in order to generate a MPE. These conventional approaches were memory and processor intensive, since evidence needs to be re-distributed and maximum potentials re-calculated. As a result, with conventional techniques many problems were not capable of being modeled within a BN, because problems having many decision states and random variables made the processing and memory requirements needed to evaluate the problem infeasible or unachievable.

At 240, a second data structure is generated that includes mappings into the first data structure. These mappings are selective index-location values into the first data structure and correspond to selective maximum potential and pointer coordinate pairs. These selective coordinate pairs are derived by using the root maximum potential as a starting point and traversing back through the first data structure to acquire the needed selective maximum potentials back to an initial or starting clique of the junction tree. Therefore, the second data structure is populated with values that are selective index-location values into the first data structure. These selective index-location values can be used to directly access the first data structure to obtain selective coordinate pairs (selective maximum potentials and pointers to selective leaves (elements of selective cliques) to form the MPE.

At 250, the mappings included in the second data structure can be traversed and processed to generate the MPE and to transmit the MPE to any requesting application that originally requested a MPE for a given problem and result. The MPE is generated, produced, derived, and transmitted without performing a full second pass on the junction tree.

In one embodiment, the first and second data structures are integer arrays that include integer values for the maximum potentials and the pointers. In this way, further processor and memory efficiency is achieved, since it takes less memory space to house integer values than it does floating-point values, and since processor operation is designed to process integers more efficiently than it is to process floating-point values.

Figure 3:
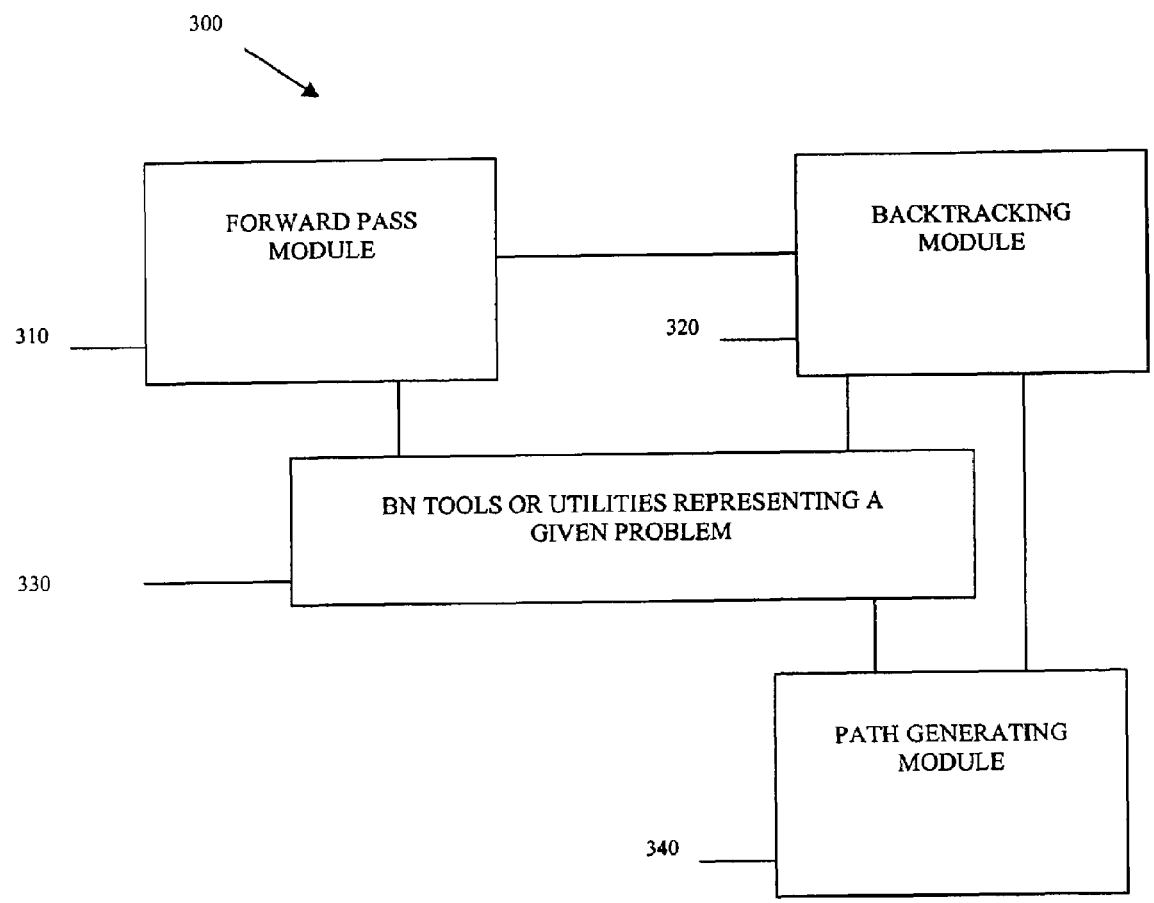
FIG. 3 is a diagram of a MPE generating system in accordance with one embodiment of the invention.

FIG. 3 is a diagram of a MPE generating system 300 residing in a computer-accessible medium. The MPE generating system 300 can be implemented as a compliment to existing and conventional BN tools or utilities. Alternatively, the MPE generating system 300 can be implemented as a stand-alone suite of software utilities or tools that interface to other existing BN tools or utilities. The MPE generating system 300 need not be in operation, but when it is in operation on one or more processors it generates a MPE for a problem modeled within a BN by performing the processing described below.

The MPE generating system 300 includes a forward pass module 310 and a backtracking module 320. The modules 310 and 320 interact with a suite of BN tools or utilities 330 to traverse and manipulate a BN representation for a decision process associated with a given instance of a problem. The BN tools or utilities 330 can be existing and conventional tools and utilities or custom BN tools or utilities.

The forward pass module 310 is used for iterating a junction tree (derived from the BN) from its leaves to its root for a given instance of a problem being evaluated. During this first pass, the forward pass module 310 uses the BN tools or utilities 330 to collect and distribute evidence to the leaves of the junction tree based on the given instance of the problem. The forward pass module 310 also uses the BN tools or utilities to alter any initially assigned potential (probability) assigned to a particular leaf based on the collected and distributed evidence. Moreover, the forward tracking module 310 retains maximum potentials for leaves vis-à-vis the remaining connecting leaves in a first data structure.

The first data structure includes a separate dimension for each random variable associated with the junction tree. Additionally, the first data structure includes index locations for housing maximum potentials for each dimension with respect to the remaining dimensions. The forward pass module 310 manages and populates the first data structure with selective maximum potentials during the first pass of the BN.

The backtracking module 320 is used for iterating the first data structure after the first pass is completed on the junction tree and after a root maximum potential for a root node of the junction tree is resolved. The root maximum potential can be resolved based on what is an expected result for the given instance of the problem or based on a provided result (known result).

The backtracking module 320 during operation iterates the first data structure beginning at the root maximum potential to all the starting leaves' potential. The selective starting leaf is the most probable beginning point in the decision process within the BN for the given instance of the problem. The root maximum potential is given or identified as expected. Therefore, the backtracking module 320 iterates back through the first data structure and selects maximum potentials needed based on the root maximum potential from the first data structure. During this selection process, the backtracking module 320 retains the index locations of the first data structure that correspond to the selected maximum potentials. In this way, the second data structure becomes a mapping into the first data structure for acquiring and building a MPE for the given instance of the problem.

In some embodiments, a separate module called a path-generating module 340 is also provided with the MPE generating system 300. The path-generating module 340 consumes the second data structure as a map into the first data structure and assembles the MPE for the given instance of the problem. Values included in the second data structure are index keys into the first data structure. Thus, the second data structure is a map into the first data structure for generating and producing the needed MPE for the given instance of the problem.

Figure 4:
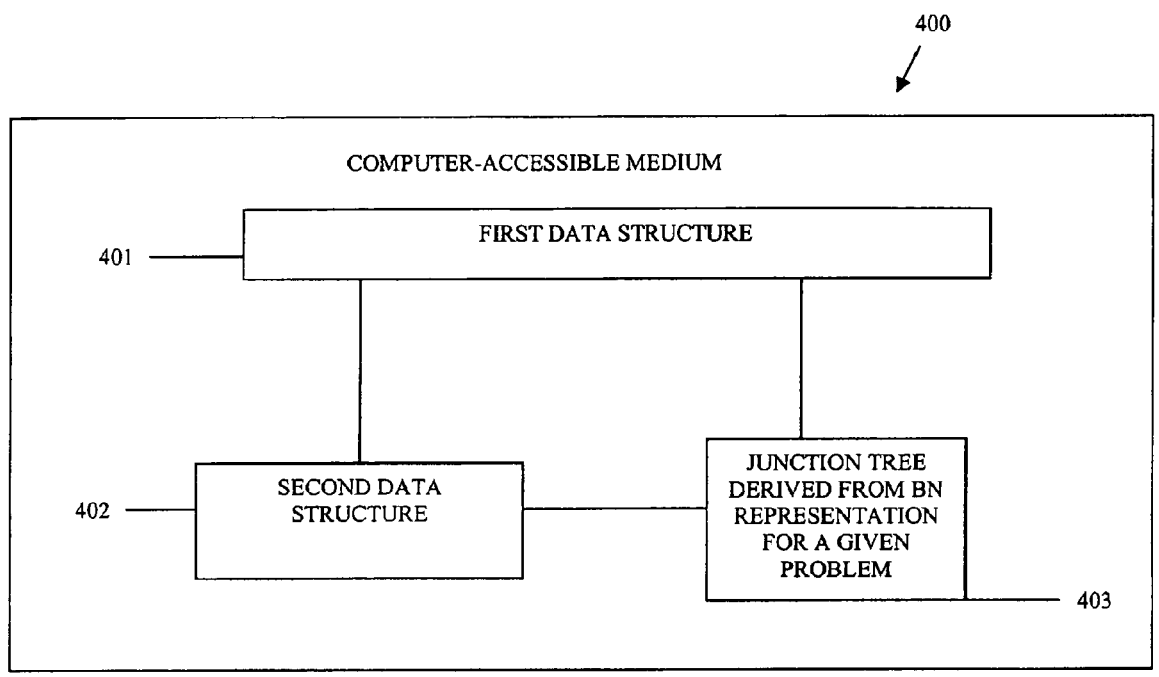
FIG. 4 is a diagram of a MPE generating apparatus in accordance with one embodiment of the invention.

FIG. 4 is a diagram of a MPE generating apparatus 400. The MPE generating apparatus 400 resides in one or more computer accessible media. The MPE generating apparatus 400 includes two data structures 401 and 402 that permit the generation of a MPE for a given problem.

The first data structure 401 is a multidimensional data structure, that includes a separate dimension for each random variable used with a junction tree 403 that is derived from a BN, which models a decision process. Within each dimension there is a separate indexed location for housing a joint maximum potential for that dimension with respect to one of the remaining dimensions. In some embodiments, each index location can also include a pointer value that references a specific child within the junction tree 403 which corresponds to the retained maximum potential.

The first data structure 401 is populated during a first pass on the junction tree 403. Example techniques for populating the first data structure are described above with respect to the descriptions of FIGS. 1-3.

The second data structure 402 selectively houses index locations associated with the first data structure 401. These selective index locations are determined by techniques presented above with respect to the descriptions of FIGS. 1-3. Each selective index location corresponds or maps to a selective maximum potential housed in the first data structure 401. The initial starting point for iterating the first data structure 401 and populating the second data structure is based on an expected or given result for the problem being evaluated in the BN.

Once the first 401 and second 402 data structures are populated, a MPE for the given problem can be readily derived by using the values of the second data structure 402 as index keys into the first data structure 401. The result is a MPE for the given problem.

The first 401 and second 402 data structures are used within a computer-accessible medium for efficiently building a MPE for a problem represented in a BN. The data structures 401 and 402 provide efficiency because their use and consumption requires less memory and processing than conventional techniques that require a full second pass on a junction tree to generate a MPE.

Figure 5:
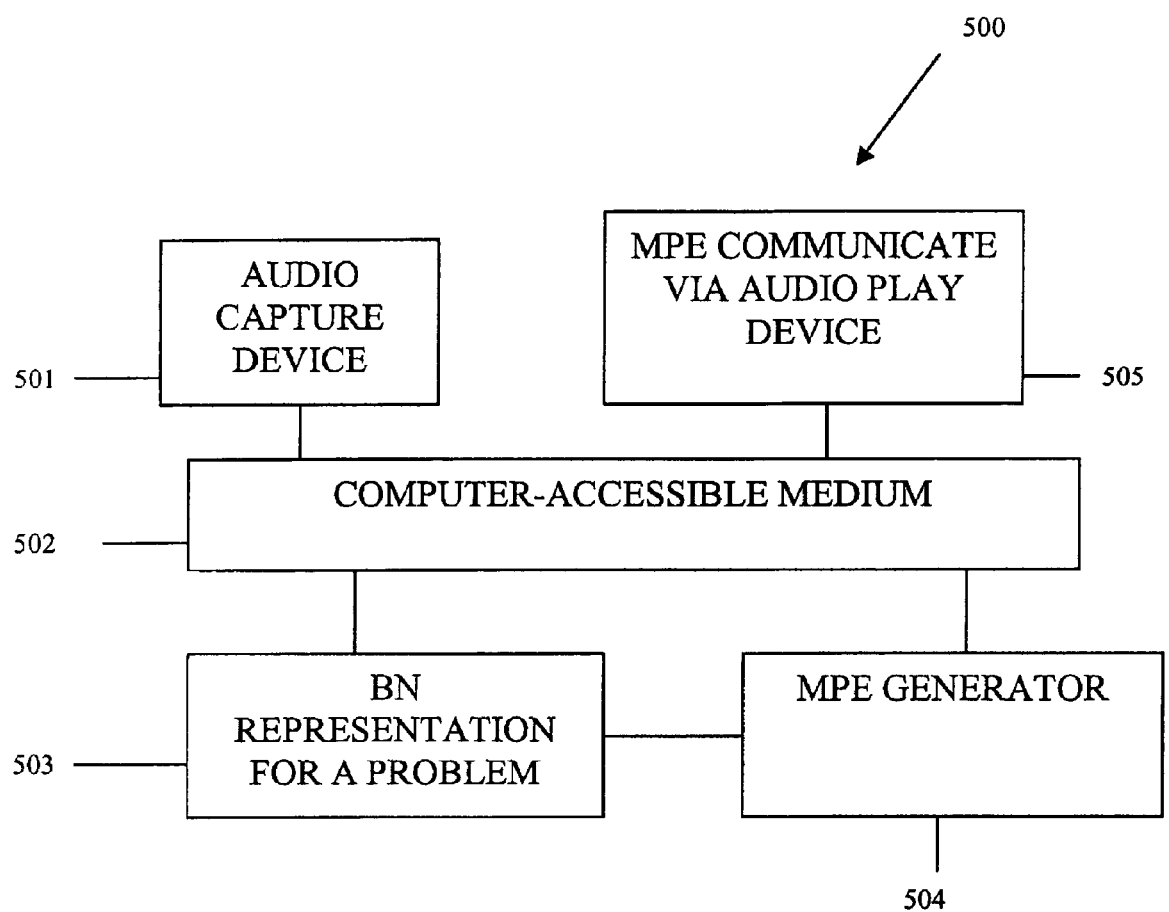
FIG. 5 is a diagram of an example voice recognition system using a number of the MPE generating techniques associated with embodiments of the invention.

FIG. 5 is a diagram 500 of an example voice recognition system using a number of the MPE generating techniques associated with embodiments of the invention. The diagram 500 shows one electronic application (voice recognition) that is suitable for using a BN and the teachings associated with embodiments of this invention. FIG. 5 is therefore presented as an example and is not intended to be limiting, since a variety of other applications can be used with embodiments of this invention, such as pattern recognition, image tracking in video streams, and the like. Any electronic application that desires to use a BN and generates a MPE according to the teachings of the embodiments associated with this invention is intended to fall within the scope of this invention.

The example diagram 500 includes an audio capture device 501, such as a phone or microphone that is networked to a computer-accessible medium 502. The computer-accessible medium 502 receives audio data from the audio capture device 501 over any network connection.

Prior to receiving audio data, a specific decision process is embodied in the computer-accessible medium 502 and represented as a specific problem within a BN 503. Thus, the audio device 501 provides input as audio data to applications processing within the computer-accessible medium 502; this audio data will drive the operations of these applications to produce a MPE (MPE generator 504). The MPE can be communicated via an audio play device 505 or communicated back to other BN 503 applications for purposes of improving the performance of the BN 503 (e.g., training the BN 503 ).

As one example for generating a MPE using a specific voice recognition system, consider a BN 503 that is used to perform some operation within a home network on appliances. The BN 503 models the decision-making process associated with performing a desired operation. Consider further that the BN 503 needs to be initially trained to perform the various operations that are available with respect to the home appliances. Audio data supplied by the audio device 501 is received as commands to the home network. Phones or Internet access (having microphones for capturing audio data) can directly connect to the home network via the computer-accessible medium 502. Alternatively, microphones placed throughout the house and near or with appliances can be used to connect to the home network.

With the present example, consider audio data that translates into the English phrase "turn the air conditioner on when the temperature in the house exceeds 80 degrees Fahrenheit." In this example, it is desired to train the BN to handle conditional statements associated with some action on the household air conditioner and thermostat. The first task is to receive the audio data and decompose it into actionable operations. This can be achieved with conventional voice recognition applications that decompose the initial phrase into specific computer-accessible media operands and operators. From this decomposition the BN 503 determines that an operation of "on" is required on the networked appliance "air conditioner" when a "status" of ">80" is detected on the network appliance identified as "thermostat." Because the BN 503 includes a variety of appliances and a variety of actions, and because the construction of the phrase can be varied, there may be a variety of choices that the BN 503 can make based on the originally provided audio data. Some of these choices are less likely than others and some are more likely than others.

To properly train the BN 503 to correctly handle this phrase initially, we interface directly with the BN 503 after providing the audio data and tell the BN 503 that the expected result is that the air conditioner is to be started automatically when the temperature in the home exceeds 80 degrees. Upon receive this result to the problem; the BN 503 identifies the result and the maximum potential namely turning the air conditioner on when >80 degrees.

Once the maximum potential at a root of junction tree derived from the BN 503 is known, the MPE for reaching that maximum potential can be generated so that the next time the BN 503 encounters this problem or one closely resembling it, the BN 503 will have the MPE to properly traverse and efficiently reach the desired result. Decision choices within the BN 503 are represented as a decision tree having sub-trees, each of the sub-trees representing various decision states to be taken by the BN 503 during processing.

To resolve the MPE in order to reach the result, the junction tree is traversed from its initial children to the defined root maximum potential, during this traversal evidence (the parsed and converted operands and operators of the original audio data) is distributed to the appropriate child leaves of the tree and any probabilities are adjusted as needed. Moreover, as each leaf is traversed its maximum potential with respect to next or connecting leaves are retained in a first data structure.

When the entire junction tree of the BN 503 has been traversed a fully populated first data structure is produced having maximum potentials for each of the children. Next, the first data structure is traversed from the identified root maximum potential back all the starting children leaves. During the traversal of the first data structure the selection of the proper child leaf to select backward within the BN 503 from the root will be dependent upon any immediate prior selection, and when multiple choices exist the maximum potential is selected to ensure efficiency within the BN 503. Also, selective maximum potentials are identified within the second data structure as index locations which map directly into locations of the first data structure.

The second data structure serves as a map for the BN 503 to rapidly select the beginning and transitional decision states within the BN 503 necessary for reaching the desired result. This derivable map is the MPE for the problem ("turn the air conditioner on when the temperature in the house exceeds 80 degrees Fahrenheit"). Thus, the initial state or selective starting child leaf within the junction tree of the BN 503 might be to check the status of connections to the thermostat and the air conditioner. The next optimal state might be to get the temperature reading from the thermostat. The next transitional state might be to wait and to check the temperature again in some configurable number of minutes, if the temperature is less than 80 degrees. A final state is to activate the air conditioner when the temperature exceeds 80 degrees; this is the maximum root potential or root.

Optionally, the BN 505 can convert the MPE into audio data and communicate the same via an audio play device for an operator, such as by producing a phrase that plays on a phone or a speaker to communicate the entire MPE. For example, "air conditioner is operational, thermostat is operational, and temperature is 81 degrees, air conditioner activated."

In some instance the operator may not need to know or desire to know the MPE and may only desire to know that the air conditioner will be turned on when appropriate and that the problem presented has been acknowledged by the home network. In other instances, the MPE is fed back to the BN to adjust its potentials based on the parsed operators and operations received from the audio data, this permits the BN 503 to learn and efficiently process other similar but not identical commands that it might receive from the operator, such as "turn the air conditioner off if the temperature in the house falls below 80 degrees Fahrenheit" or "turn the air conditioner on if the temperature in the house exceeds 75 degrees Fahrenheit." In fact the latter phrase is a new situation, but it will follow the exact MPE produced by our example for 80 degrees, since the only difference is a conditional evaluation of an expression based on collected evidence (80 versus 75) associated with the problem.

FIG. 5 and the example application presented with FIG. 5 is presented for purposes of understanding only, since there are many different instances of problems and electronic applications that utilize BNs, where the generation of a MPE is of value. In all these situations the teachings of the embodiments of this invention provide improved MPE generation because there is no need to perform a memory and processor intensive full second iteration on the junction tree of the BN 503.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method, comprising:
    iterating a junction tree derived from a Bayesian Network (BN) from leaves to a root and storing maximum potentials in a first data structure during a first pass, wherein the first data structure is a multidimensional Integer array;
    determining a root maximum potential; and
    iterating the first data structure starting at a root first index location within the multidimensional Integer array and retaining selective first index locations from the first data structure that corresponds to selective maximum potentials within a second data structure, wherein the second data structure an Integer array that retains Integer-index location values that map into the selective first index locations of the first data structure having the selective maximum potentials, and wherein the junction tree does not require a second pass to derive a most probably explanation.

2. The method of claim 1 further comprising assembling from the first data structure the most probable explanation from the root to the leaves, in response to the second data structure.

3. The method of claim 1 wherein iterating the BN further includes collecting evidence from the leaves to the root, and identifying the maximum potentials in response to the collected evidence.

4. The method of claim 1 wherein determining further includes determining the root maximum potential based on a given result for a problem being evaluated within the BN.

5. The method of claim 1 wherein iterating the junction tree further includes storing a pointer within the first data structure for each maximum potential, wherein each pointer corresponds to element in a child potential.

6. The method of claim 5 wherein iterating the first data structure further includes accessing the first data structure with the first index locations retained in the second data structure, and obtaining the corresponding pointers to form the most probable explanation from the root to the leaves.

7. A method, comprising:
    generating a first data structure housing coordinate pairs for a junction tree, each coordinate pair having a maximum potential and a pointer to a child potential, wherein the first data structure is assembled during a first pass of the junction tree and wherein the first data structure is a multidimensional Integer array; and
    generating a second data structure including mappings to selective coordinate pairs of the first data structure, where the mappings combine to form a most probable explanation (MPE) from a root of the junction tree to the leaves of the junction tree, and the MPE represents decisions made in reaching a result for a problem, and wherein the second data structure is an Integer array that houses the mappings as index values into the multidimensional Integer array and wherein the MPE is formed without performing a second pass on the junction tree.

8. The method of claim 7 further comprising collecting evidence from leaves of the junction tree to the root, and populating the coordinate pairs of the first data structure by iterating from the leaves to the root for the problem.

9. The method of claim 8 further comprising populating the mappings of the second data structure by iterating the first data structure after a root maximum potential is determined for the given problem.

10. The method of claim 7 further comprising creating the mappings as integer values that correspond to locations within the first data structure for the selective coordinate pairs.

11. The method of claim 7 further comprising transmitting the MPE as a technique for reaching the result associated with the problem.

12. The method of claim 7 wherein generating the first and second data structures further includes using integer values for the pairs and the mappings.

13. A system, comprising:
    a forward pass module to iterate a junction tree from its leaves to a root and to store maximum potentials in a first data structure and to determine a root maximum potential, wherein the junction tree is processed during a first pass of its leaves to the root and wherein the first data structure is a multidimensional Integer array; and
    a backtracking module to iterate the first data structure at a root first index location and to retain selective first index locations from the first data structure within a second data structure, and wherein the selective first index locations correspond to selective maximum potentials within the first data structure, and wherein the second data structure is an Integer array that includes index values into the multidimensional Integer array, and wherein the junction tree does not require a second pass to assemble a most probable explanation.

14. The system of claim 13 further comprising a path-generating module that assembles the most probable explanation (MPE) from the first data structure in response to the second data structure, and wherein the MPE is acquired by backtracking.

15. The system of claim 13 wherein the forward pass module collects evidence for variables of the junction tree and determines the maximum potentials from the collected evidence.

16. The system of claim 13 wherein the forward pass module determines the root maximum potential in response to a result for a given problem.

17. A machine accessible medium having associated data, which when accessed, carries out in a machine the method of:
   iterating from leaves of a junction tree to a root and storing maximum potentials in a first data structure, wherein the junction tree is iterated once during a first pass and wherein the first data structure is a multidimensional Integer array;
   determining a root maximum potential for a result of a given problem; and
   iterating the first data structure to assemble selective maximum potentials for the given problem, wherein the selective maximum potentials are identified in a second data structure as selective index locations into the first data structure, wherein the second data structure is an Integer array and includes the index locations into the first data structure having the selective maximum potentials, and wherein the junction tree does not require iteration for a second pass to resolve a most probable explanation.

18. The medium of claim 17 wherein the second data structure represents the most probable explanation within the junction tree for the given problem to reach the result.

19. An apparatus in a computer accessible medium comprising:
   a first data structure to store maximum potentials for leaves and a root of a junction tree for a given problem, wherein the first data structure is a multidimensional Integer array that includes the maximum potentials after a single and first pass of the junction tree; and
   a second data structure to house selective locations from the first data structure, wherein the selective locations form a most probable explanation from the first data structure once a root maximum potential for the given problem is determined, and wherein the second data structure is an Integer array that includes the selective locations and wherein the most probable explanation is formed without processing a second pass against the junction tree.

* * * * *